(12) United States Patent
Ogino (10) Patent No.: US 7,015,988 B2
(45) Date of Patent: Mar. 21, 2006

(54) PEDESTAL OF LIQUID CRYSTAL DISPLAY APPARATUS

(75) Inventor: Yoshihiro Ogino, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 5 days.

(21) Appl. No.: 10/869,818

(22) Filed: Jun. 16, 2004

(65) Prior Publication Data

US 2005/0052586 A1 Mar. 10, 2005

(30) Foreign Application Priority Data

Jun. 20, 2003 (JP) .......................... P2003-176142

(51) Int. Cl.
*G02F 1/1335* (2006.01)

(52) U.S. Cl. .......................... 349/62; 349/58; 349/60; 349/65

(58) Field of Classification Search .................. 349/58, 349/61–63, 67, 60, 65; 248/916–918
See application file for complete search history.

(56) References Cited

U.S. PATENT DOCUMENTS 6,476,884 B1 * 11/2002 Shao .......................... 349/58
6,563,705 B1 * 5/2003 Kuo .......................... 361/687
6,950,087 B1 * 9/2005 Knox et al. .................. 345/102
2003/0090864 A1 * 5/2003 Kuo .......................... 361/683

FOREIGN PATENT DOCUMENTS

JP 63-94481 4/1988
JP 2-96794 4/1990

* cited by examiner

*Primary Examiner*—Andrew Schechter
*Assistant Examiner*—Phu Vu
(74) *Attorney, Agent, or Firm*—Osha Liang LLP (57) ABSTRACT

A pedestal of the liquid crystal display apparatus includes: a prism lens, which collects, from among the light that is illuminated from a back light that is exposed via an opening of a liquid crystal panel housing part, the light that is illuminated to the rear in the opposite direction of a liquid crystal panel side and guides the light to a pedestal part side; a collimator lens for making parallel the light guided by prism lens to the pedestal part side; a reflecting plate for reflecting the light made parallel by collimator lens to a front face side of pedestal part; and a display part, on which a display is carried out by illumination of the light reflected by reflecting plate.

8 Claims, 6 Drawing Sheets

PEDESTAL OF LIQUID CRYSTAL DISPLAY APPARATUS

BACKGROUND OF THE INVENTION

1. Field of the Invention

The invention relates a pedestal of the liquid crystal display, and more specifically relates to the pedestal of the liquid crystal display using for a liquid crystal television having back lights.

2. Description of the Related Art

Liquid crystal televisions having back lights have been known. Such liquid crystal televisions having back lights using the back lights for other purposes have been proposed. (see Japanese Published Unexamined Patent Application No. Hei-2-96794).

Japanese Published Unexamined Patent Application No. Hei-2-96794 discloses a liquid crystal television, wherein a liquid crystal display panel is detachably mounted to back lights (thin type light emitting devices), which in turn are mounted to a supporting column, and for television viewing, the liquid crystal panel is fitted onto the back lights to use the back lights as back lights for liquid crystal television while when television viewing is not performed, the liquid crystal display panel is removed from the back lights to use the back lights as illumination devices.

However, with the prior-art liquid crystal television disclosed in Japanese Published Unexamined Patent Application No. Hei-2-96794, when the back lights are to be used as illumination devices, use cannot be made as a liquid crystal television since the liquid crystal display must be removed. It is thus difficult to use the back lights as illumination devices at the same time as enabling viewing of the liquid crystal television.

With televisions that are not liquid crystal televisions using back lights but are televisions that use a CRT, arts for using the light of the CRT for other uses have been proposed (see, for example, Japanese Published Unexamined Utility Model Application No. Sho-63-94481).

Japanese Published Unexamined Utility Model Application No. Sho-63-94481 discloses a structure, wherein light emitted from a lower part of the front face of a CRT of a television is collected to illuminate a display plate. With Japanese Published Unexamined Utility Model Application No. Sho-63-94481, display by the display plate using the light from the CRT can be performed at the same time as enabling television viewing.

However, with Japanese Published Unexamined Utility Model Application No. Sho-63-94481, since the light from inside the CRT leaks to the exterior from the lower part of the front face, the picture quality of the television image that is displayed on the front face of the CRT may be considered to degrade correspondingly. It is thus difficult with the prior art to use the light source for a television for another purpose while the television is viewed and yet without degrading the picture quality.

With Japanese Published Unexamined Utility Model Application No. Sho-63-94481, since two reflecting plates and one converging lens are required to guide the light from the CRT to the display plate, there is the issue that the number of parts becomes large.

SUMMARY OF THE INVENTION

The present invention has been made to resolve the above issues. It is an object of the invention to provide a pedestal of the liquid crystal display, with which a light source for a television can be used for another purpose while the television is being viewed and yet without degrading the picture quality of the television.

It is an another object of this invention to guide the light of back lights, which are the light source, to the side of a pedestal part without increasing the number of parts in the abovementioned pedestal of the liquid crystal display.

According to a first aspect of this invention, there is provided in a pedestal of the liquid crystal display including: a pedestal part for supporting a liquid crystal television, having a liquid crystal panel, for displaying a television image, disposed inside a liquid crystal panel housing part and tubular back lights, for illuminating light towards the front at which the liquid crystal panel is positioned, disposed at a back side of the liquid crystal panel inside the liquid crystal panel housing part; a pedestal of the liquid crystal display further comprising: a prism lens, having a light collecting part, with a concave, curved shape, positioned so as to oppose a rear part of the tubular back lights that is exposed via an opening of the liquid crystal panel housing part, which is provided at a part of the liquid crystal panel housing part positioned at a rear side of the tubular back lights, and collecting, from among the light that is illuminated from the tubular back lights, the light that is illuminated to the rear in the opposite direction of the liquid crystal panel side and guiding this light to the pedestal part side; a collimator lens, positioned at the pedestal part side of the prism lens and making parallel the light guided from the prism lens to the pedestal part side; a reflecting plate, positioned inside the pedestal part and reflecting the light made parallel by the collimator lens to a front face side of the pedestal part; and a display part, positioned at the front face of the pedestal part and on which a display is carried out by illumination of the light reflected by the reflecting plate.

With this pedestal of the liquid crystal display of the first aspect, by the provision of the prism lens, which collects, from among the light that is illuminated from the tubular back lights that are exposed via the opening of the liquid crystal panel housing part, the light that is illuminated to the rear in the opposite direction of the liquid crystal panel side and guides this light to the pedestal part side as described above, the light, which is illuminated to the rear of the back lights and does not contribute to the display by the liquid crystal panel, can be guided by the prism lens to the pedestal part side. Since the display by the display part, which is provided at the front face of the pedestal part, is thus carried out using the light that is guided to the pedestal part side and does not contribute to the display by the liquid crystal panel, the light illuminated from the tubular back lights can be used to carry out the display on the display part of the pedestal part while the liquid crystal television is being viewed and yet without degrading the picture quality of the liquid crystal television. By forming the prism lens to have a light collecting part, with a concave, curved shape, disposed at the rear side of the tubular back lights, the light that is illuminated to the rear of the back lights and does not contribute to the display by the liquid crystal panel can be guided readily to the prism lens.

With the pedestal of the liquid crystal display of the first aspect, since by the provision of the collimator lens, which is positioned at the pedestal part side of the prism lens in order to make parallel the light guided from the prism lens to the pedestal part side, and the reflecting plate, which is positioned inside the pedestal part in order to reflect the light made parallel by the collimator lens to the front face side of the pedestal part, as described above, the light that is guided by the prism lens to the pedestal part side can be illuminated onto the display part in a parallel state, the dispersion of the light that is illuminated onto the display part of the pedestal part can thus be restrained, and the display quality at the display part of the pedestal part can thereby be improved.

A second aspect of this invention provides in a pedestal of the liquid crystal display comprising: a pedestal part for supporting a liquid crystal television, having a liquid crystal panel, for displaying a television image, disposed inside a liquid crystal panel housing part, and tubular back lights, for illuminating light towards the front at which the liquid crystal panel is positioned, disposed at a back side of the liquid crystal panel inside the liquid crystal panel housing part; a pedestal of the liquid crystal display further comprising: a prism lens, having a light collecting part, with a concave, curved shape, formed so as to extend integrally from a rear side of the tubular back lights to a position inside the pedestal part that corresponds to a front face of the pedestal part and positioned so as to oppose a rear part of the tubular back lights that is exposed via an opening of the liquid crystal panel housing part, which is provided at a part of the liquid crystal panel housing part positioned at the rear side of the tubular back lights, and collecting, from among the light that is illuminated from the tubular back lights, the light that is illuminated to the rear in the opposite direction of the liquid crystal panel side and guiding this light to the pedestal part side; and a display part, positioned at the front face of the pedestal part and on which a display is carried out by illumination of the light guided by the prism lens.

With this pedestal of the liquid crystal display of the second aspect of this invention, by the provision of the prism lens, which collects, from among the light that is illuminated from the tubular back lights that are exposed via the opening of the liquid crystal panel housing part, the light that is illuminated to the rear in the opposite direction of the liquid crystal panel side and guides this light to the pedestal part side as described above, the light, which is illuminated to the rear of the back lights and does not contribute to the display by the liquid crystal panel, can be guided by the prism lens to the pedestal part side. Since the display by the display part, which is provided at the front face of the pedestal part, is thus carried out using the light that is guided to the pedestal part side and does not contribute to the display by the liquid crystal panel, the light illuminated from the tubular back lights can be used to carry out the display on the display part of the pedestal part while the liquid crystal television is being viewed and yet without degrading the picture quality of the liquid crystal television. , by forming the prism lens to have a light collecting part, with a concave, curved shape, disposed so as to oppose the rear part of the tubular back lights, the light that is illuminated to the rear of the back lights and does not contribute to the display by the liquid crystal panel can be guided readily to the prism lens. Furthermore, by forming the prism lens to extend integrally from the rear side of the tubular back lights to the position inside the pedestal part that corresponds to the front face of the pedestal part, the light can be illuminated directly onto the display part that is positioned at the front face of the pedestal part without using a reflecting plate, etc. The light of the back lights can thus be guided to the pedestal part side without increasing the number of parts in comparison to the case where a reflecting plate, etc., is used.

A third aspect of this invention provides a pedestal of the liquid crystal display comprising: a pedestal part for supporting a liquid crystal television, having a liquid crystal panel for displaying a television image and back lights for illuminating light towards the front at which the liquid crystal panel is positioned, and disposed at the back side of the liquid crystal panel; and a prism lens, having a light collecting part, positioned at the rear side of the back lights, collecting, from among the light that is illuminated from the back lights, the light that is illuminated in the opposite direction of the liquid crystal panel side, and guiding this light to the pedestal part side.

With this pedestal of the liquid crystal display of the third aspect of this invention, by the provision of the prism lens, which collects the light that is illuminated in the opposite direction of the liquid crystal panel side and guides this light to the pedestal part side as described above, the light, which is illuminated from a part of the back lights that does not contribute to the display by the liquid crystal panel, can be guided by the prism lens to the pedestal part side. Since the display by the display part, which is provided at the pedestal part, is thus carried out using the light that is guided to the pedestal part side and does not contribute to the display by the liquid crystal panel, the light illuminated from tubular back lights can be used to carry out the display on the display part of the pedestal part while the liquid crystal television is being viewed and yet without degrading the picture quality of the liquid crystal television.

With the above-described pedestal of the liquid crystal display of the third aspect, preferably the back lights are tubular and the light collecting part of the prism lens includes a light collecting part, having a concave, curved shape and positioned so as to oppose a rear part of the tubular back lights. By this arrangement, the light that is illuminated to the rear of the back lights and does not contribute to the display of the liquid crystal panel can be guided readily to the prism lens.

The above-described pedestal of the liquid crystal display of the third aspect preferably further includes: a collimator lens, positioned at the pedestal part side of the prism lens and making parallel the light guided by the prism lens to the pedestal part side; a reflecting plate, positioned inside the pedestal part and reflecting the light made parallel by the collimator lens to a front face side of the pedestal part; and a display part, on which a display is carried out by illumination of the light reflected by the reflecting plate. By this arrangement, since light that is made parallel is illuminated onto the display part, the display quality at the display part of the pedestal part can be improved.

With the above-described pedestal of the liquid crystal display of the third aspect, preferably the prism lens is formed so as to extend integrally from the rear side of the back lights to a position inside the pedestal part that corresponds to the front face of the pedestal part, and furthermore, a display part, positioned at the front face of the pedestal part and on which a display is carried out by illumination of the light guided by the prism lens, is equipped. By this arrangement, the light of the back lights can be guided to the pedestal part side without increasing the number of parts.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Embodiments of this invention shall now be described based on the drawings.

(First Embodiment)

Figure 1:
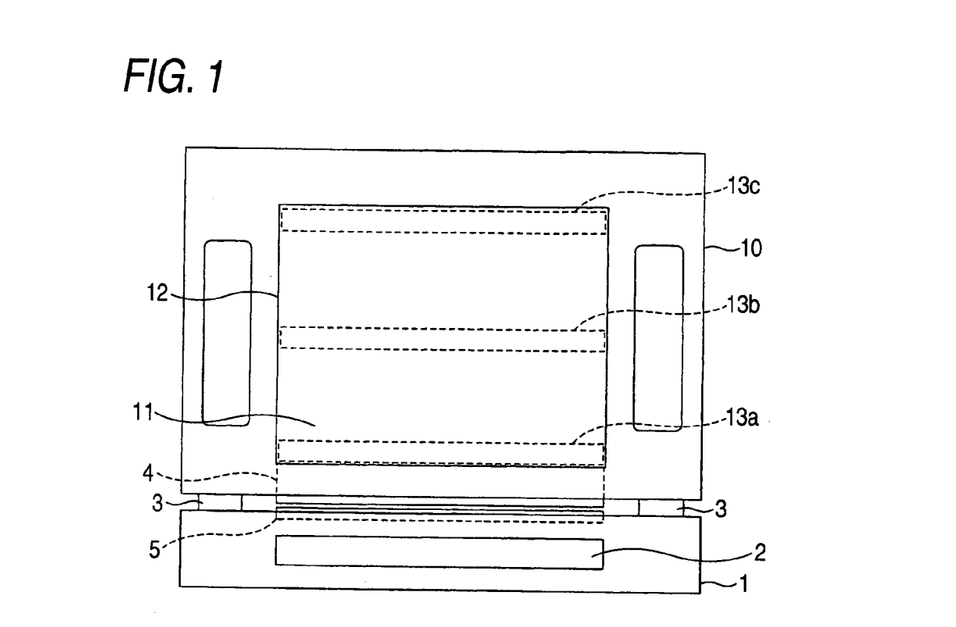
FIG. 1 is a front view of a liquid crystal display apparatus that includes a pedestal of a liquid crystal display apparatus of a first embodiment of the invention.
Figure 2:
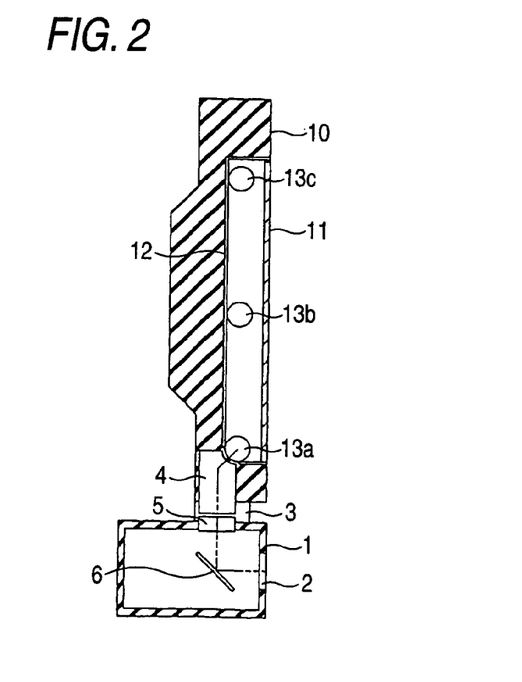
FIG. 2 is a sectional side view of the liquid crystal display apparatus of the first embodiment shown in FIG. 1.
Figure 3:
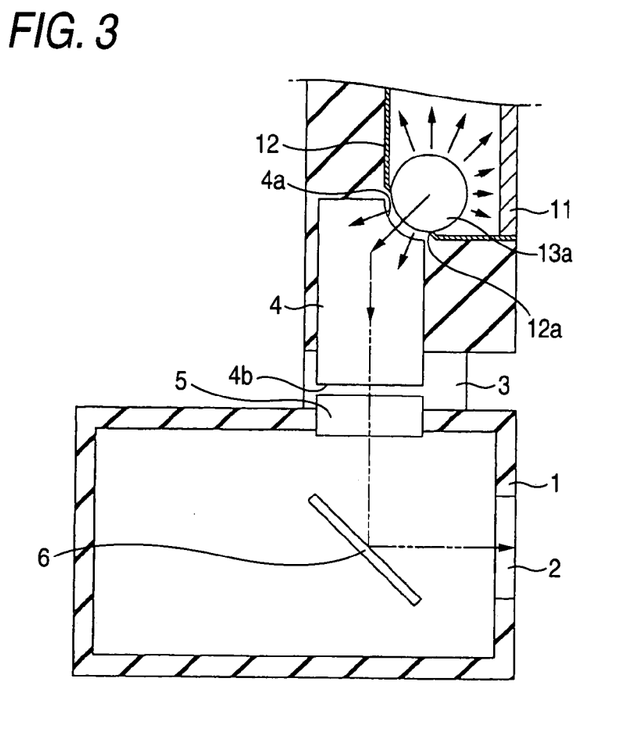
FIG. 3 is a partially enlarged view of the liquid crystal display apparatus of the first embodiment shown in FIG. 2.
Figure 4:
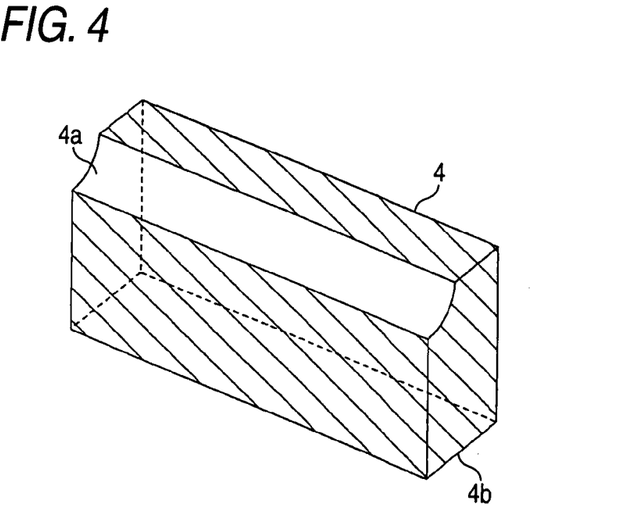
FIG. 4 is a perspective view of a prism lens included in the pedestal of the first embodiment.

FIG. 1 is a front view of a liquid crystal television that includes a pedestal of the liquid crystal display apparatus of a first embodiment of this invention. FIG. 2 is a sectional side view of the liquid crystal television of the first embodiment shown in FIG. 1, and FIG. 3 is a partially enlarged view of FIG. 2. FIG. 4 is a perspective view of a prism lens included in the pedestal of the liquid crystal display apparatus of the first embodiment. The structure of the liquid crystal television that includes the pedestal of the liquid crystal display apparatus of the first embodiment of this invention shall now be described with reference to FIG. 1 to FIG. 4.

As shown in FIG. 1 and FIG. 2, the liquid crystal television, which includes the pedestal of the liquid crystal display apparatus of the first embodiment, is equipped with a liquid crystal television part 10 and a glass pedestal part 1. Liquid crystal television part 10 includes a liquid crystal panel 11, a metal liquid crystal panel housing part 12, and tubular back lights 13a, 13b, and 13c. Liquid crystal panel 11 is positioned inside liquid crystal panel housing part 12. , tubular back lights 13a to 13c are positioned at predetermined intervals at a back face side of liquid crystal panel 11 inside liquid crystal panel housing part 12.

Here, with the first embodiment, an opening 12a is provided, as shown in FIG. 3, at a region of liquid crystal panel housing part 12 that is positioned to the rear of tubular back light 13a, which is closest to pedestal part 1. A rear side part of tubular back light 13a is exposed due to this opening 12a.

With the first embodiment, pedestal part 1 includes a display part 2, a supporting part 3, a prism lens 4, a collimator lens 5, and a reflecting plate 6. Display part 2 is positioned at a front face of pedestal part 1 and has a decorative picture sheet, with which a picture is made to appear by illumination light, adhered onto an outer surface thereof. , supporting part 3 is provided for supporting liquid crystal television part 10. As shown in FIG. 3, prism lens 4 includes a light collecting part 4a, having a concave, curved shape and positioned so as to oppose the exposed rear part of tubular back light 13a. as shown in FIG. 4, all surfaces (parts) of prism lens 4 besides light collecting part 4a and a light lead-out part 4b, positioned at a lower face, are covered by a reflecting coating layer. Collimator lens 5 is positioned so as to oppose light lead-out part 4b of prism lens 4 across a predetermined interval and has a function of making parallel the light that is emitted from light lead-out part 4b.

Reflecting plate 6 is provided for reflecting the light that has been made parallel by collimator lens 5 towards display part 2.

The light lead-out path of the pedestal of the liquid crystal display apparatus of the first embodiment shall now be described. First, the light that is illuminated to the rear of tubular back light 13a, which is closest to pedestal part 1 is collected by light collecting part 4a of concave, curved shape of prism lens 4 and thereby guided to light lead-out part 4b at the pedestal part 1 side. The light emitted from light lead-out part 4b of prism lens 4 is then made parallel by collimator lens 5. The light that has thus been made parallel is then reflected by reflecting part 6 and illuminated on display part 2. The decorative picture is thereby made to appear and a display is thus carried out on display part 2.

As described above, with the first embodiment, by the provision of prism lens 4, which collects, from among the light that is illuminated from back light 13a, the light that is illuminated to the rear in the opposite direction of the liquid crystal panel 11 side and guides this light to the pedestal part 1 side, the light, which is illuminated to the rear of back lights 13 and does not contribute to the display by liquid crystal panel 11, can be guided by prism lens 4 to the pedestal part 1 side. Since the display by display part 2, which is provided at the front face of pedestal part 1, can thus be carried out using the light that is guided to the pedestal part 1 side and does not contribute to the display by liquid crystal panel 11, the display at display part 2 of pedestal part 1 can be performed using light illuminated from tubular back light 13a without degrading the picture quality of the liquid crystal television. , since the display at display part 2 of pedestal part 1 can be carried out while performing display on liquid crystal panel 11, the display at display part 2 can be carried out even while the liquid crystal television is being viewed.

With the first embodiment, by forming prism lens 4 so as to have light collecting part 4a, having a concave, curved shape and being positioned so as to oppose the rear side of tubular back light 13a, light, which is illuminated to the rear of back light 13a and does not contribute to the display by liquid crystal panel 11, can be guided readily to prism lens 4.

With the first embodiment, by the provision as described above of collimator lens 5 for making parallel the light that is guided by prism lens 4 to the pedestal part 1 side and the reflecting plate 6 for reflecting the light, which has been made parallel by collimator lens 5, to the front face side of pedestal part 1, the light that is guided to the pedestal part 1 side by prism lens 4 can be illuminated on display part 2 in a parallel state and the dispersion of the light illuminated on display part 2 of pedestal part 1 can thus be restrained. The display quality at display part 2 of pedestal part 1 can thus be improved.

(Second Embodiment)

Figure 5:
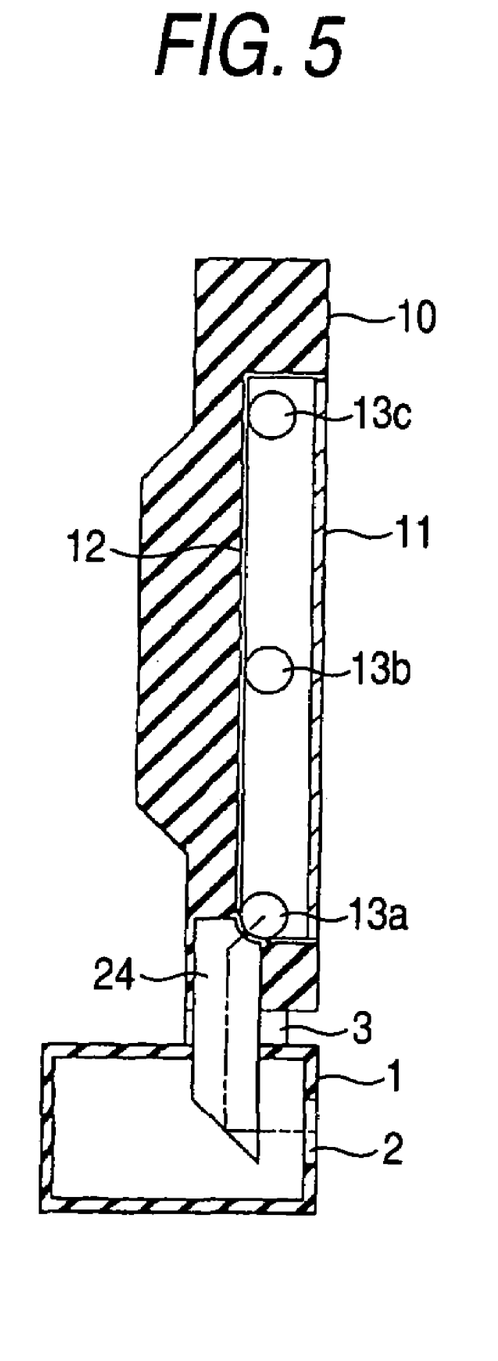
FIG. 5 is a sectional side view of a liquid crystal display apparatus including a pedestal of the liquid crystal display apparatus of a second embodiment of the invention.
Figure 6:
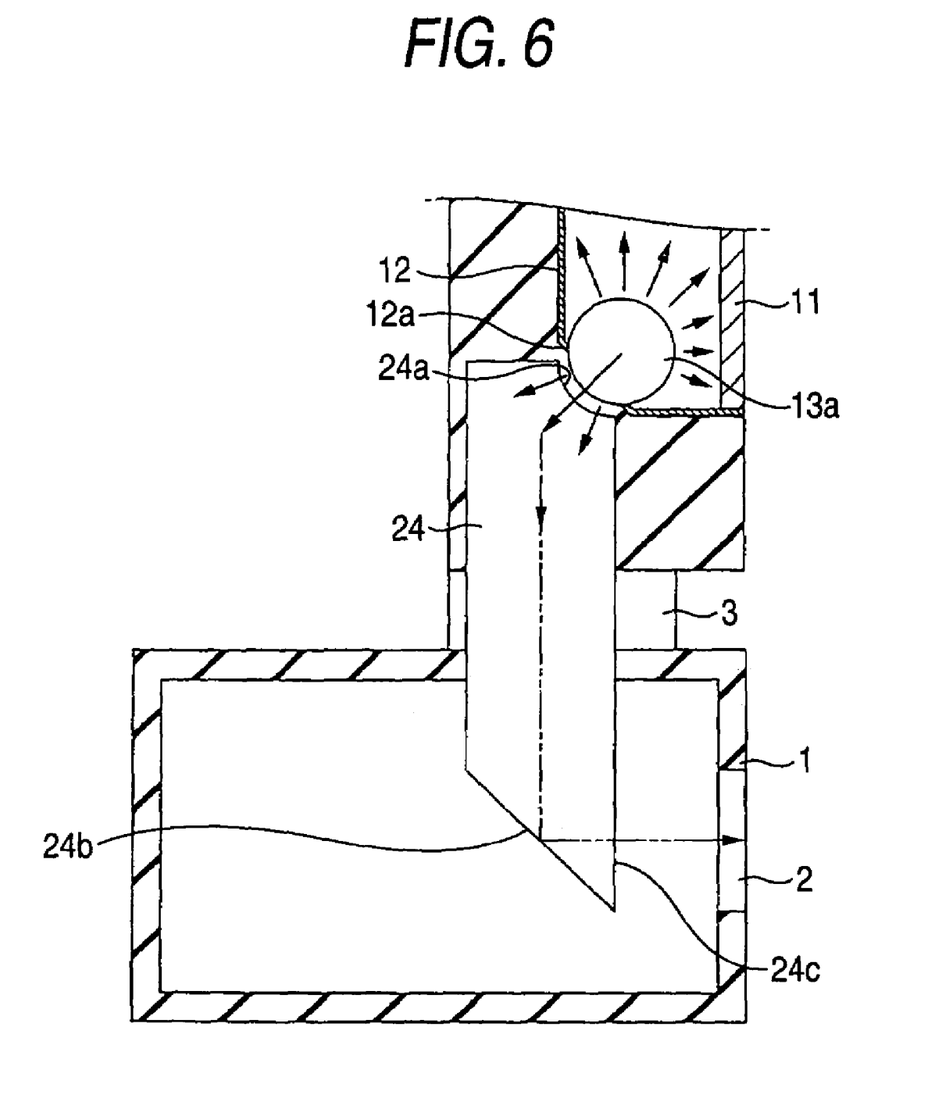
FIG. 6 is a partially enlarged view of the liquid crystal display apparatus of the second embodiment shown in FIG. 5.
Figure 7:
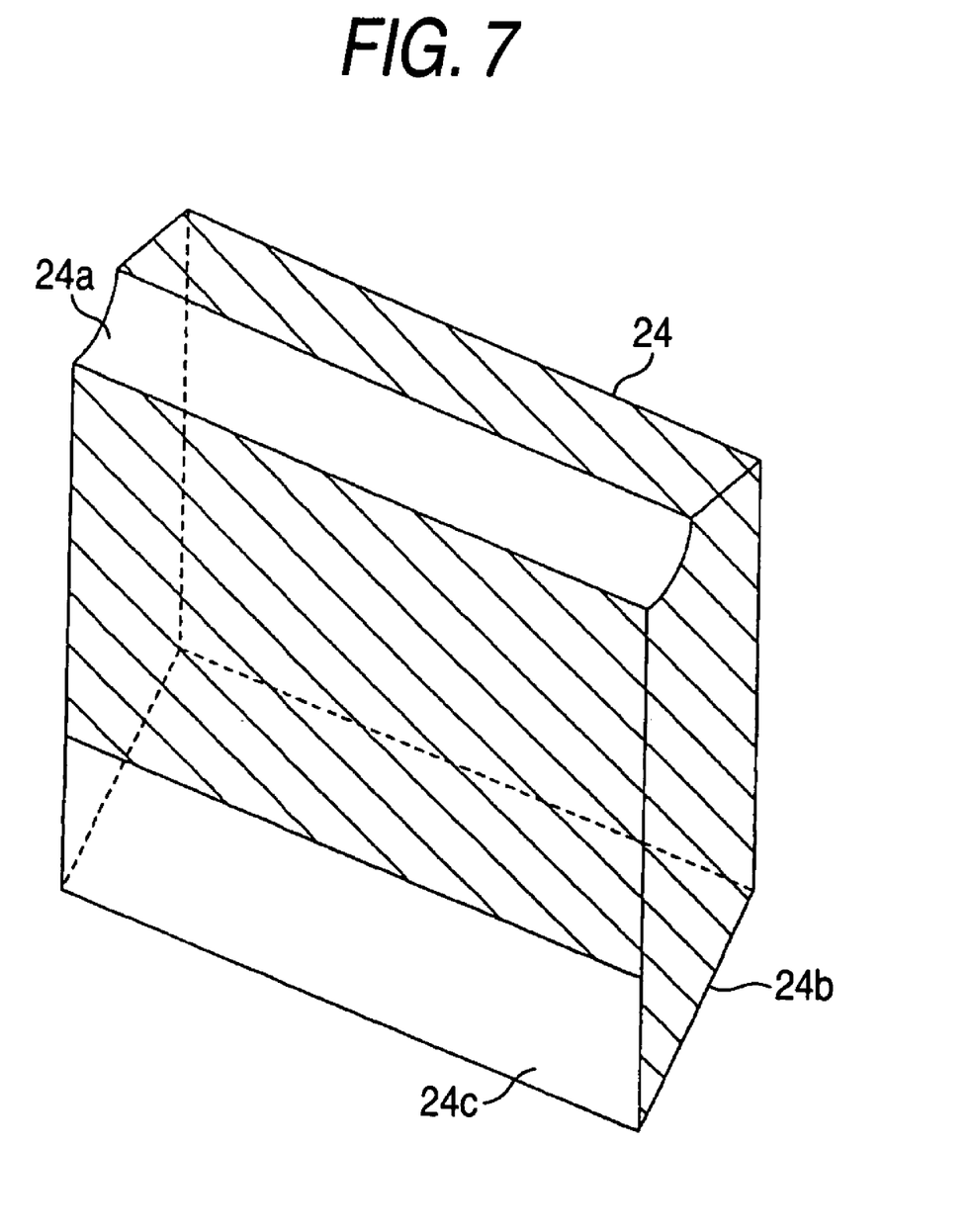
FIG. 7 is a perspective view of a prism lens included in the pedestal of the liquid crystal display apparatus of the second embodiment.

FIG. 5 is a sectional side view of a liquid crystal television including a pedestal of the liquid crystal display apparatus of a second embodiment of this invention, and FIG. 6 is a partially enlarged view of FIG. 5. FIG. 7 is a perspective view of a prism lens included in the pedestal of the liquid crystal display apparatus of the second embodiment. This second embodiment, which is an example where, unlike the above-described first embodiment, the light of back lights is guided to a display part by using just a prism lens and without using a collimator lens nor a reflecting plate, shall now be described with reference to FIG. 5 to FIG. 7.

That is, as shown in FIG. 5 and FIG. 6, with the pedestal of the liquid crystal display apparatus of this second embodiment, a prism lens 24 is formed so as to extend integrally from a rear side of a tubular back light 13a to a position inside a pedestal part 1 that corresponds to a front face of pedestal part 1. as shown in FIG. 6 and FIG. 7, prism lens 24 includes a light collecting part 24a, having a concave, curved shape and being positioned so as to oppose a rear part of back light 13a. all parts of prism lens 24 besides light collecting part 24a and a light lead-out part 24c, positioned at a lower part of the front face, are covered by a reflecting coating layer. , a lower face 24b, covered by the reflecting coating layer, has a shape that is inclined by a predetermined angle so as to be able to reflect light in a forward direction.

With regard to the light lead-out path of the liquid crystal television of the second embodiment, first, the light that is illuminated to the rear of tubular back light 13a, which is closest to pedestal part 1, is collected by light collecting part 24a of concave, curved shape of prism lens 24 and thereafter guided to the part of prism 24 at the pedestal part 1 side. The light that has been guided to the pedestal part 1 side is then reflected by lower face 24b of prism 24 and thereafter emitted from light lead-out part 24c. The light that has been emitted from light lead-out part 24c is illuminated on display part 2.

With the second embodiment, by forming prism lens 24 so as to extend integrally from the rear side of tubular back light 13a to the position inside pedestal part 1 that corresponds to the front face of pedestal part 1 as described above, light can be illuminated directly on display part 2, positioned at the front face of pedestal part 1, without the use of a reflecting plate 6, etc. The number of parts can thereby be reduced in comparison to the above-described first embodiment.

Figure 8:
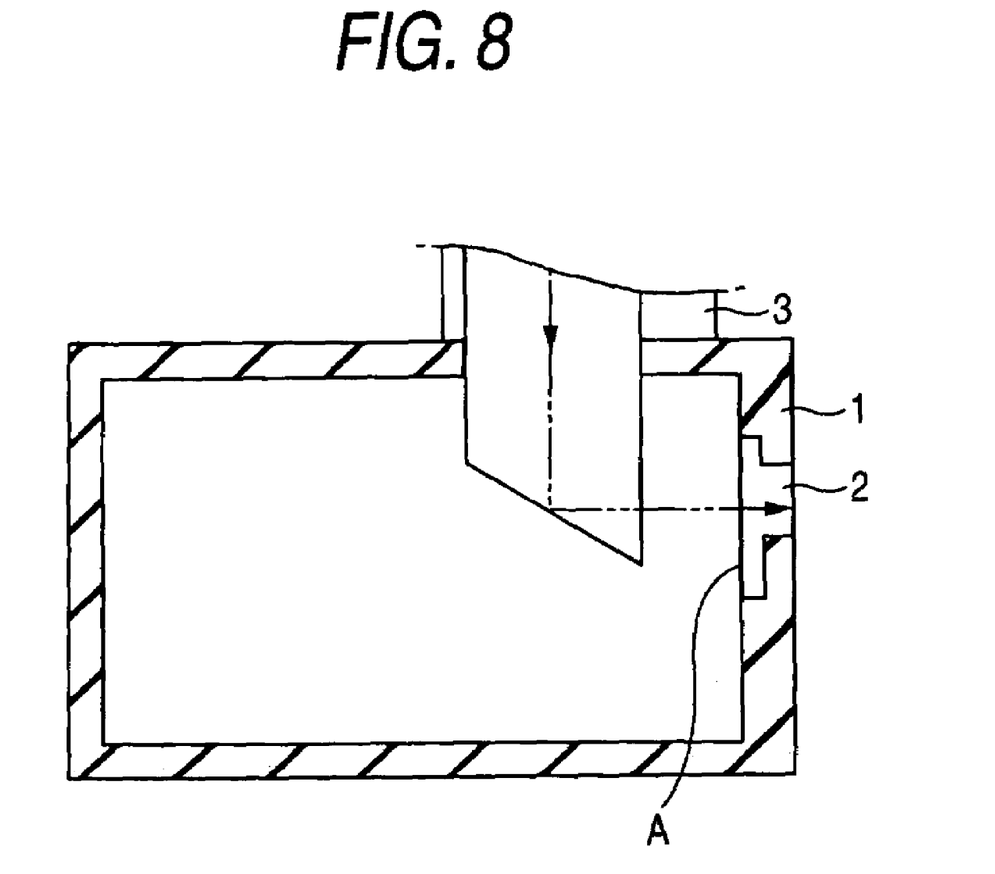
FIG. 8 is a partially enlarged view of a plate inserting portion A which is provided with the display part.

FIG. 8 shows a partial enlarged view of a plate inserting portion A which is provided with the display part 2. When a plate is inserted into the plate inserting portion A from a side face of the pedestal part 1, an image information of the plate can be displayed by using the light which is illuminated on the display part 2. As the image information, for example, "FUNAI ELECTRIC CO., LTD" which produces the liquid crystal display apparatus can be displayed. When the plate insertion portion A, for example, is integrally formed with inside the pedestal part 1 as shown in FIG. 8, an exterior of the pedestal part 1 is very excellent. In the FIG. 8 shows a part of the prism lens 24 which is as same as that of the second embodiment of the invention. However, the prism lens is not limited in that of the second embodiment.

The other effects of the second embodiment are the same as those of the first embodiment described above.

It is to be understood that the embodiments disclosed herein are by all means illustrative and not restrictive. The scope of the present invention is defined by the claims and not by the preceding description of the embodiments, and all changes that fall within the meets and bounds of the claims or equivalence of such meets and bounds are therefore intended to be embraced by the claims.

For example, though with the above-described first and second embodiments, cases were described wherein light at a rear side of tubular back lights is collected using a prism lens, this invention is not limited thereto and light may be collected from back lights of shapes that are not tubular. Even in this case, by collecting the light at the rear side of back lights, which does not contribute to the display by a liquid crystal panel, by a prism lens as in the first and second embodiments described above, a display by a display part using light that is illuminated from back lights can be carried out without degrading the picture quality of a liquid crystal television.

Though with the above-described first and second embodiments, cases were described wherein light is illuminated on a display part provided on a pedestal part, this invention is not limited thereto and light may be illuminated onto the entirety of the pedestal part to light up the pedestal part without providing a display part.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pedestal of a liquid crystal display apparatus comprising:

a liquid crystal panel housing part including a liquid crystal panel for displaying a television image;

a pedestal part supporting the liquid crystal display apparatus; and at least one tubular back light illuminating light towards a front at which the liquid crystal panel is positioned and disposed at a back side of the liquid crystal panel, wherein an opening is provided at a part of the liquid crystal panel housing part positioned at a rear side of the at least one tubular back light, at least one prism lens has a light collecting part which is curved to be formed in concave shape, and is positioned to oppose a rear part of the at least one tubular back light which is exposed via the opening of the liquid crystal panel housing part, the at least one prism collects a light illuminated toward a rear in an opposite direction of a liquid crystal panel side from among the light illuminated from the at least one tubular back light and guiding the light to a pedestal part side, at least one collimator lens is positioned at the pedestal part side of the prism lens to make parallel the light guided from the prism lens to the pedestal part side, at least one reflecting plate is positioned inside the pedestal part and reflects the light made parallel by the at least one collimator lens to a front face side of the pedestal part, and a display part is positioned at the front face of the pedestal part and on which a display is carried out by illumination of the light reflected by the at least one reflecting plate.

2. The pedestal of the liquid crystal display apparatus according to claim 1, wherein the display part of the pedestal part is provided with a plate inserting portion into which a plate including an image information is inserted.

3. The pedestal of the liquid crystal display apparatus according to claim 2, wherein the plate inserting portion is integrally formed with inside the pedestal part.

4. A pedestal of a liquid crystal display apparatus comprising:
- a liquid crystal panel housing part including a liquid crystal panel for displaying a television image;
- a pedestal part supporting the liquid crystal display apparatus; and
- at least one tubular back light illuminating light towards a front at which the liquid crystal panel is positioned and disposed at a back side of the liquid crystal panel, wherein
- an opening is provided at a part of the liquid crystal panel housing part positioned at a rear side of the tubular back light,
- at least one prism lens formed to extend integrally from a rear side of the at least one tubular back light to a position inside the pedestal part that corresponds to a front face of the pedestal part, which has a light collecting part which is curved to be formed in concave shape, and which is positioned to oppose a rear part of the at least one tubular back light which is exposed via the opening of the liquid crystal panel housing part,
- the at least one prism lens collects a light illuminated toward a rear in an opposite direction of a liquid crystal panel side from among the light illuminated from the at least one tubular back light and guiding the light to a pedestal part side, and
- a display part is positioned at the front face of the pedestal part and on which a display is carried out by illumination of the light guided by the at least one prism lens.

5. A pedestal of a liquid crystal display apparatus comprising:
- a pedestal part supporting the liquid crystal display apparatus, the pedestal part including;
  - a liquid crystal panel displaying a television image; and
  - at least one back light illuminating light towards a front at which the liquid crystal panel is positioned and disposed at a back side of the liquid crystal panel; and
- at least one prism lens having a light collecting part positioned at a rear side of the at least one back light and collecting a light illuminated in an opposite direction of a liquid crystal panel side from among a light illuminated from the at least one back light, and guiding the light illuminated in the opposite direction of the liquid crystal panel side to a pedestal part side.

6. The pedestal of the liquid crystal display apparatus according to claim 5, wherein
- the at least one back light is formed in tubular shape, and
- the light collecting part include a part which is positioned to oppose a rear part of the at least one back light and is curved to be formed in concave shape.

7. The pedestal of the liquid crystal display apparatus according to claim 5, wherein
- the liquid crystal display apparatus further include;
- at least one collimator lens positioned at a pedestal part side of the prism lens to make parallel the light guided from the prism lens to the pedestal part side;
- at least one reflecting plate positioned inside the pedestal part and reflects the light made parallel by the at least one collimator lens to a front face side of the pedestal part; and
- a display part on which a display is carried out by the illumination of the light reflected by the at least one reflecting plate.

8. The pedestal of the liquid crystal display apparatus according to claim 5, wherein
- the at least one prism lens is formed to extend integrally from a rear side of the at least one back light to a position inside the pedestal part that corresponds to a front face of the pedestal part, and
- the liquid crystal display apparatus further includes a display part which is positioned at a front face of the pedestal part and on which a display is carried out by the illumination of the light guided by the at least one prism lens.

* * * * *